United States Patent Office 3,553,135
Patented Jan. 5, 1971

3,553,135
LITHIUM-TITANIUM-MANGANESE COPPER-MICROWAVE FERRITE
Paul D. Baba, San Carlos, and Subir K. Banerjee, Menlo Park, Calif., assignors to Ampex Corporation, Redwood City, Calif., a corporation of California
No Drawing. Filed July 11, 1968, Ser. No. 743,942
Int. Cl. C04b 35/26
U.S. Cl. 252—62.59
5 Claims

ABSTRACT OF THE DISCLOSURE

A ferrite having a high remanence ratio and having an excellent temperature response is provided from a composition wherein $$Li^+_{.5(1+x-y)}Fe^{3+}_{2.5-.5(3x+y)-z}Ti^{4+}_xCu^{2+}_yMn^{3+}_zO_4$$

$x$ is from 0.1 to 1.0
$y$ is from 0.01 to 0.4
$z$ is from 0.01 to 0.3

The invention herein described was made in the course of a subcontract with the Department of United States Air Force.

SUMMARY OF THE INVENTION

At microwave frequencies garnets and ferrites have previously been used which did not have adequate temperature response and which had low remanence ratios. By remanence ratio is meant the $M_r$ value divided by saturation magnetization, $M_s$, obtained at room temperature in a field of 10,000 oe. Typical materials in the past had a remanence ratio of less than 0.7 and typically the remanent magnetization at 70° C. was 90% or less than the comparable remanent magnetization at 20° C. To be acceptable as microwave ferrite materials, low field magnetic losses and dielectric losses must be low. Typical suitable materials in accordance with the present invention have low field magnetic losses varying from 0.05 db to 0.4 db and dielectric loss of 0.4 to 0.8 db as measured in S-band helical phase shifter.

Garnets of comparable $4\pi M_s$ values which are now available for use in microwave environments have remanence ratios less than 0.7 and poor temperature response —at 70° C. their remanent magnetization falls to 90% or worst of room temperature values. In low field magnetic and dielectric losses the materials of the present invention are comparable $4\pi M_s$ garnets. In price, on the other hand, the ferrites are cheaper to produce than the rare earth garnets.

DESCRIPTION OF THE PREFERRED EMBODIMENTS

The ferrites of the present invention have the formula:

$$Li^+_{.5(1+x-y)}Fe^{3+}_{2.5-.5(3x+y)-z}Ti^{4+}_xCu^{2+}_yMn^{3+}_zO_4$$

$x$ is from 0.1 to 1.0 and preferably from 0.6 to 0.9
$y$ is from 0.01 to 0.4 and preferably from 0.05 to 0.2
$z$ is from 0.01 to 0.3 and preferably from 0.05 to 0.1

The valence states given are theoretically correct but it is possible that in formulating the ferrite, there may be some shifting from the exact values shown but nevertheless the chemical formula, as shown by the subscript numbers, will remain correct.

In order to carry out the present invention, the materials, as defined above are first mixed together in a ball mill with a suitable liquid such as alcohol or water to form an intimate mixture. The mixture is then calcined in air at a temperature of about 900° C. and the mixture is again ball-milled with a suitable liquid and mixed with an organic binder. The resulting powder is then pressed into a desired shape and fired in an atmosphere of oxygen at a temperature of from 1000° C. to 1300° C. for several hours. The material is then cooled to room temperature and is then suitable for use. The heating and cooling are in an oxygen atmosphere.

The following non-limiting examples illustrate various preferred embodiments of the invention:

EXAMPLE I

Composition number L–21–68 $Li_{.75}Fe_{1.3}Ti_{.7}Cu_{.2}Mn_{.05}O_4$

The following chemicals were weighed out and mixed with alcohol in a ball mill for 16 hours with steel balls.

| | Weight, g. | Percent |
|---|---|---|
| $Fe_2O_3$ | 176.3 | 49.5 |
| $Li_2CO_3$ | 46.7 | 13.2 |
| $MnCO_3$ | 10.4 | 2.9 |
| $TiO_2$ | 94.3 | 26.7 |
| $CuO$ | 26.9 | 7.7 |

After mixing, the mixture was calcined at 900° C. for 4 hours. After calcination, the mixture was again ball-milled with alcohol for 16 hours with steel balls. After the second ball-milling, the powder was mixed with an organic binder and screened through a No. 60 mesh screen; 7.5 g. of the resultant powder was pressed in a cylindrical die of 0.550 in. diameter at a total force of 5000 lbs. The procedure was repeated to produce a second identical cylinder. One toroid of 0.5 in. outer diameter was also pressed at 5000 lbs. total force.

The two cylinders and the toroid were heated slowly to 315° C. over 30 hours to burn off the binder. After that the furnace was heated to 1115° C. under 1 atmosphere pressure of oxygen, soaked at 1115° C. for 5 hours and then cooled to room temperature (20° C.) also under 1 atmosphere of oxygen.

The following important magnetic properties were found by studying the above mentioned cylinders and the toroid:

Dielectric loss, db [1] _____ 0.67
Magnetic loss, db [1] _____ 0.0
$4\pi M_s$ (saturation magnetization at 10,000 Oe),
  gauss _____ 437
$4\pi M_s$ (remanence), gauss _____ 340
$M_r/M_s$ _____ 0.78
Curie temperature, ° C. _____ 275
Percentage fall of $M_r$ (remanance) on heating from
  20° C. to 70° C., percent _____ 7
Correcive force, oersteds _____ 4.2

[1] Insertion loss in thee remanent state in an S-band helical phase shifter.

EXAMPLE II

Composition number L–21–70 $Li_{.85}Fe_{1.2}Ti_{.8}Cu_{.1}Mn_{.05}O_4$

The following chemicals were weighed out:

| | Weight, g. | Percent |
|---|---|---|
| $Fe_2O_3$ | 162.8 | 46.5 |
| $Li_2CO_3$ | 53.0 | 15.3 |
| $MnCO_3$ | 10.4 | 3.0 |
| $TiO_2$ | 107.8 | 31.4 |
| $CuO$ | 13.4 | 3.8 |

Two cylinders and one toroid of this composition were then prepared following exactly the method outlined in Experiment 1. The important magnetic properties measured are given below:

Dielectric loss=0.51 db
Magnetic loss=0.05 db
$4\pi M_s$=287 gauss
$4\pi M_r$=211 gauss
$M_r/M_s$=0.74
Curie temperature=226° C.

Percentage fall of $M_r$ on heating from 20° C. to 70° C.=5%

Coercive force=3.0 oersteds

EXAMPLE III

Composition number L-21-71/F576

$Li_{.875}Fe_{1.225}Ti_{.8}Cu_{.05}Mn_{.05}O_4$

The following chemicals were weighed out:

|  | Weight, g. | Percent |
|---|---|---|
| $Fe_2O_3$ | 166.2 | 48 |
| $Li_2CO_3$ | 54.5 | 15.8 |
| $MnCO_3$ | 10.4 | 3.1 |
| $TiO_2$ | 107.8 | 31.2 |
| $CuO$ | 6.7 | 1.9 |

Two cylinders and one toroid of this composition were then prepared following exactly the method outlined in Experiment 1. The important magnetic properties measured are given below:

Dielectric loss=0.54 db
Magnetic loss=0.0 db
$4\pi M_s$=330 gauss
$4\pi M_r$=237 gauss
$M_r/M_s$=0.72
Curie temperature=236° C.
Percentage fall of $M_r$ on heating from 20° C. to 70° C.=7%
Coercive force=2.8 oersteds

EXAMPLE IV $Li_{.75}Fe_{1.54}Ti_{.6}Cu_{.1}Mn_{.01}O_4$

What is claimed is:

1. A microwave ferrite having a remanence ratio of at least 0.7 having the following molecular formula:

$$Li^+{}_{.5(1+x-y)}Fe^{3+}{}_{2.5-.5(3x+y)-z}Ti^{4+}{}_xCu^{2+}{}_yMn^{3+}{}_zO_4$$

wherein $x$ is from 0.1 to 1
$y$ is from 0.01 to 0.4
$z$ is from 0.01 to 0.3

2. A ferrite in accordance with claim 1 wherein:
$x$ is from 0.6 to 0.9
$y$ is from 0.05 to 0.2
$z$ is from 0.05 to 0.1

3. A microwave ferrite in accordance with claim 1 having the formula $Li_{.75}Fe_{1.3}Ti_{.7}Cu_{.2}Mn_{.05}O_4$.

4. A microwave ferrite in accordance with claim 1 having the formula $Li_{.85}Fe_{1.2}Ti_{.8}Cu_{.1}Mn_{.05}O_4$.

5. A microwave ferrite in accordance with claim 1 having the formula $Li_{.875}Fe_{1.225}Ti_{.8}Cu_{.05}Mn_{.05}O_4$.

References Cited

UNITED STATES PATENTS

| 3,065,182 | 11/1962 | Aghajanian | 252—62.61X |
| 3,177,145 | 4/1965 | Bronlow | 252—62.61X |
| 3,483,126 | 12/1969 | Sara et al. | 252—62.59 |

TOBIAS E. LEVOW, Primary Examiner

J. COOPER, Assistant Examiner

U.S. Cl. X.R.

252—62.6, 62.61